April 5, 1955
K. E. A. GÖTHBERG
2,705,545
SELF-EMPTYING LIQUID SEPARATOR
Filed Dec. 11, 1951
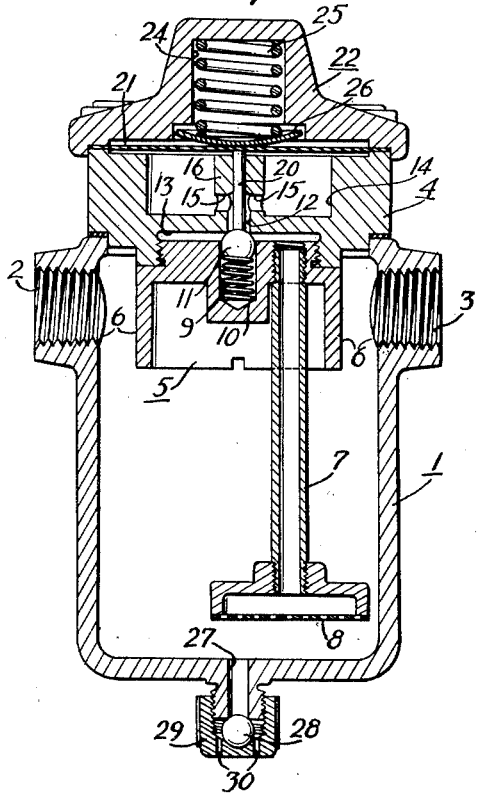
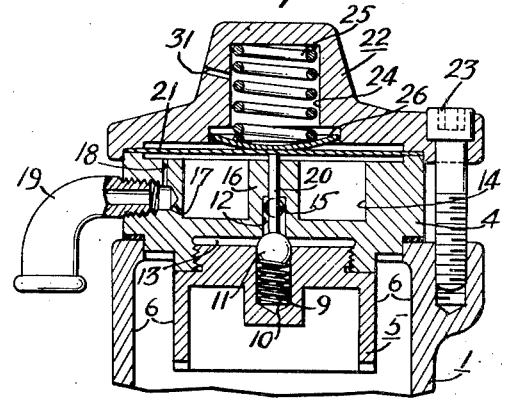
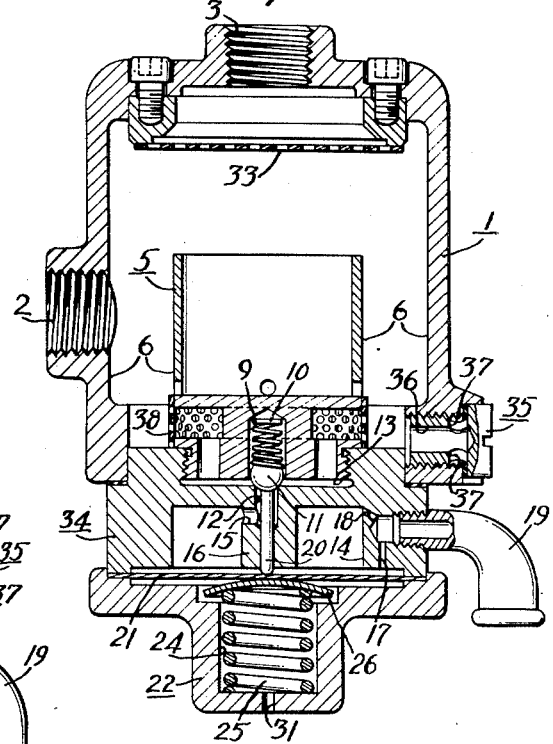
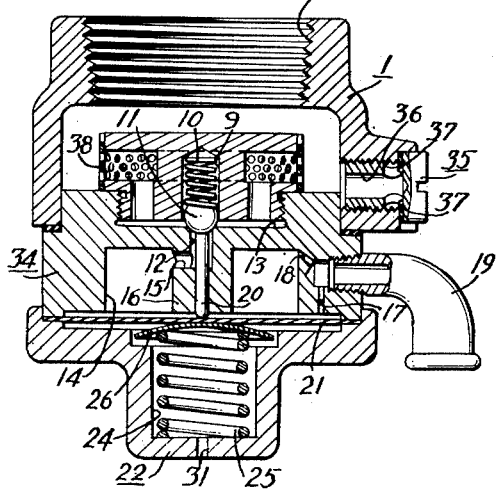
Inventor:
Karl Evald Andreas Göthberg
by his Attorneys
Howson & Howson

United States Patent Office 2,705,545
Patented Apr. 5, 1955

2,705,545

SELF-EMPTYING LIQUID SEPARATOR

Karl Evald Andreas Göthberg, Goteborg, Sweden, assignor to Aktiebolaget Svenska Kullagerfabriken, Goteborg, Sweden, a corporation of Sweden Application December 11, 1951, Serial No. 261,083

Claims priority, application Sweden December 27, 1950

4 Claims. (Cl. 183—42)

Water is often condensed in pipes through which flows air under pressure. This water must be separated from the air, because of its injurious effects, for instance when the pressure air is used for creating an oil mist for the lubrication of bearings or the like. In this case the water must be separated from the air and removed in a suitable manner. It is of course possible to tap off the water by hand from time to time, but this method has certain disadvantages. The apparatus must be carefully supervised which entails increased cost, but in spite of this the water may in some cases collect more quickly than expected or the operator may forget to remove the water, in which case the water is carried by the air into the machines and bearings where the air is used.

The present invention relates to an apparatus for separating and removing liquids from a stream of gas in a pressure duct and has for its purpose to provide a self-emptying liquid separator, which is dependable and which continuously and automatically separates and removes the liquid from the gas duct. The apparatus according to the invention comprises a liquid separating chamber for connection to the pressure line and a pressure governing chamber having one or more outlets for the liquid, the said pressure governing chamber being in communication with the separating chamber through a reducing valve controlled by the pressure in the pressure governing chamber.

The invention is illustrated on the accompanying drawings in which Fig. 1 shows a vertical section through one form of the separator and Fig. 2 shows a portion of another vertical section. Fig. 3 shows a corresponding section of an apparatus in which the reducing valve and the outlet are located below the container and Fig. 4 shows a form adapted to be connected for example to an existing container or directly to the duct.

Corresponding parts in the various figures are denoted by the same designations.

The separator according to Figures 1 and 2 is provided with a cylindrical container 1 in which is an inlet 2 and an outlet 3 for the stream of gas from which liquid is to be separated. The inlet and outlet may, however, be reversed. The top of the container is covered by a top-piece 4 to which is screwed a downwardly directed cylindrical separating member 5. The member 5 is, as is apparent from Fig. 1, located between the inlet 2 and the outlet 3, but an annular space 6 is provided between the member 5 and the wall of the container. To the member 5 is connected a vertical tube 7 at the lower end of which is mounted a sieve 8 near the bottom of the container. In the member 5 there is provided a central bore 9, in which is located a pressure spring 10 acting on a ball 11. The spring 10 presses in a direction toward the outlet from a channel 12 in the top-piece 4. The tube 7 is in communication with the outlet of the channel 12 through a chamber 13 formed between the members 4 and 5.

The top-piece 4 is provided with an annular groove 14, which forms a chamber and which is in communication with a channel 12 through channels 15 formed in a central upwardly projecting part 16 of the top-piece. In the top-piece are further provided a pair of small holes 17 and 18, which together with a pipe 19 of considerably greater area form an outlet for the liquid. Water leaving the container normally passes through the hole 17, which is in communication with the lower part of the chamber 14. The hole 18, which is in communication with the upper part of the chamber serves the purpose of maintaining a uniform flow of water and air through the outlet. In certain cases it may, however, be dispensed with.

The upper part of the upwardly projecting member 16 is provided with a vertical hole, which forms a guide for a pin 20, which at its lower end bears against the ball 11 and at its upper end against a membrane 21, fixed between the upper plane surface of the top-piece 4 and a cover 22, which is connected to the container 1 by screws 23. The central portion of the cover 22 is formed as a housing 24 for a spring 25, the lower end of which bears against a rounded disc 26, which bears against the centre of the membrane directly above the pin 20. The ball 11 and the pin 20 are thus contained between the spring 10 on one side and the membrane 21 and the spring 25 on the other and the position of the ball will thus depend upon the position of the membrane, which in its turn depends on the pressure in the chamber 14. The chamber above the membrane communicates with the atmosphere through an opening 31. The ball opens the mouth of the channel 12 at atmospheric pressure in the chamber, but closes it for a slight overpressure, for example $\frac{1}{10}$ of an atmosphere. To make this possible without undesirably great losses of pressure air, the holes 17 and 18 must be relatively small.

The device functions in the following manner. The gas enters through the opening 2 and impinges against the member 5. Liquid contained in the flow of gas falls into the container 1 or collects on the member 5, from which it drops to the bottom of the container. This part of the container thus forms a liquid separating chamber. The stream of gas divides and flows through the annular space 6 on either side of the member 5 after which the main part of the gas escapes through the opening 3. Part of the gas, however, flows up through the tube 7 past the ball 11, through the channels 12 and 15 to the chamber 14. From this chamber it escapes through the holes 17 and 18 to the outlet pipe 19. If pressure in the chamber 14 increases the membrane 21 is raised against the pressure of the spring 25 so that the ball 11 approaches the mouth of the channel 12 and partially closes the mouth. If, on the other hand, the pressure in the chamber 14 drops, the communication between the chamber 14 and the container 1 is opened further. The chamber 14 is therefore a pressure governing chamber. The ball 11 forms a reducing valve, which considerably reduces the pressure at the outlet holes 17 and 18. These holes can therefore be made somewhat larger and will thus become less prone to become choked. At the same time the losses in air pressure through these holes will be less and independent of the primary pressure.

When the level of the liquid reaches the sieve 8, the flow of gas up through the tube 7 carries with it liquid to the chamber 14, from which the liquid escapes through the hole 17. If a temporary copious flow of liquid takes place, the hole 18 serves the purpose of permitting it to quickly flow into the chamber 14. The chamber is thus filled as quickly as the air can escape through the hole 18. The volume of this chamber should not be too small so that it can temporarily accommodate considerable quantities of liquid, which successively escape through the hole 17, at the same time as air escapes continuously through the hole 18. Since the hole 18 is always open to permit air to escape an increase of pressure in the chamber 14 will seldom take place and the apparatus thus works more evenly.

As fast as liquid collects in the container, it is removed through the tube 7, past the ball 11 and through the chamber 14 to the outlet pipe 19. The liquid is thus removed continuously and automatically without supervision.

At the bottom of the container is provided an outlet hole 27, which is normally kept closed by a ball 28, pressed against the hole 27 by a nut 29. When the nut is loosened several turns, the hole 27 is opened so that any impurities, which have collected in the container may be permitted to escape past the ball through a pair of holes 30 in the nut.

In the form of the invention according to Fig. 3, the reducing valve and the outlets for the liquid are located under the container 1. The outlet 3 for the air is at the top. Under the air outlet is a sieve 33. The top-piece has in this case been replaced by a bottom-piece 34 which, however, serves the same purpose as the top-piece. The liquid separated from the air is collected at the bottom of the container and flows through a cylindrical sieve 38 to the ball 11, from where it continues through channels 12 and 15 to the annular groove 14, from which it is evacuated through the holes 17 and 18 located at different heights, as has already been described in connection with Fig. 1. At the bottom of the container is a plug 35 with a longitudinal channel 36 and a pair of cross channels 37. By unscrewing the plug somewhat impurities can be removed through the channels 36 and 37 without the necessity of removing the plug entirely. The form of the invention according to Fig. 4 differs from the form according to Fig. 3 only therein that the container is of less volume and lacks the special separating member. It is provided with a suitable thread 39 for connecting to an existing container of another type or directly to the pipe lines.

Although the apparatus will mainly be used for separating water from air it may of course also be used to separate other liquids from air or water or other liquids from other gases. The reducing valve can be located at such other places, as may be found suitable in each separate case, for instance at the side of the container. In certain cases an extra container may be connected to the chamber 14 to increase the volume. The holes 17 and 18 are then provided in the additional container 17 at its bottom and 18 at its top.

I claim:

1. An automatic drain device for draining liquid from a pressure line for gas, said device comprising a chamber having an opening for communication with said pressure line, a permanently open outlet in the wall of said chamber communicating with a region of substantially atmospheric pressure, a reducing valve affording a means for variable control of said opening and, thereby, of the connection between the pressure line and the said chamber, and means responsive to the pressure within the chamber for governing the position of the reducing valve.

2. An automatic drain device for liquid separators of the type adapted for association with pressure lines for gas and which separators include means for separating liquid from the pressure gas and a receptacle for the liquid so separated, said device comprising a chamber having an opening for communication with said receptacle and through said receptacle with the pressure line, a permanently open outlet in the wall of said chamber communicating with a region of substantially atmospheric pressure, a reducing valve affording a means for variable control of said opening and, thereby, of the connection between pressure line and the said chamber, and means responsive to the pressure within the chamber for governing the position of the reducing valve.

3. An automatic drain device for liquid separators of the type adapted for association with pressure lines for gas and which separators include a receptacle in the pressure line and liquid separating means for removing liquid from the pressure gas and for diverting the separated liquid to the receptacle, said drain device comprising a pressure governing chamber and means for connecting said chamber in communication with the said receptacle, a permanently open outlet in the wall of said pressure governing chamber, said outlet having a small cross-sectional area relative to the cross sectional area of the pressure line where it enters and leaves said receptacle, a reducing valve controlling the connection between the chamber and receptacle, and means responsive to variations in the pressure within the said governing chamber for controlling the position of said reducing valve.

4. An automatic drain device for draining liquid from a pressure line for gas, said device comprising a receptacle having inlet and outlet ports for connecting the receptacle in the pressure line, a separating member in operative association with the inlet port and operative to separate liquid from the pressure gas and to direct it to the bottom of the receptacle, a pressure governing chamber having an opening communicating with the lower part of the receptacle, a permanently open outlet in the wall of said pressure governing chamber communicating with a region of substantially atmospheric pressure, a reducing valve controlling said opening, and means responsive to variations in the pressure within said chamber to govern the position of said reducing valve.

References Cited in the file of this patent

UNITED STATES PATENTS

| 761,109 | Simmons | May 31, 1904 |
| 2,393,119 | Paashe | Jan. 15, 1946 |
| 2,418,440 | White et al. | Apr. 1, 1947 |
| 2,509,505 | Johnson | May 30, 1950 |
| 2,541,282 | Powers | Feb. 13, 1951 |